US012733081B2

(12) United States Patent
Johnson et al.

(10) Patent No.: US 12,733,081 B2
(45) Date of Patent: Sep. 8, 2026

(54) DISTRIBUTED LIGHTING PROGRAM IMPLEMENTATION AND COLOR CORRECTION

(71) Applicant: Axis Innovations, LLC, Lindon, UT (US)

(72) Inventors: Joseph Leedan Johnson, Lindon, UT (US); Grant Hagen, Lindon, UT (US)

(73) Assignee: Axis Innovations, LLC, Lindon, UT (US)

( * ) Notice: Subject to any disclaimer, the term of this patent is extended or adjusted under 35 U.S.C. 154(b) by 15 days.

(21) Appl. No.: 18/946,536

(22) Filed: Nov. 13, 2024

(65) Prior Publication Data

US 2025/0168954 A1 May 22, 2025

Related U.S. Application Data

(60) Provisional application No. 63/599,951, filed on Nov. 16, 2023.

(51) Int. Cl.
*H05B 47/16* (2020.01)
*H05B 47/155* (2020.01)
*H05B 47/165* (2020.01)
*H05B 47/19* (2020.01)

(52) U.S. Cl.
CPC ......... *H05B 47/165* (2020.01); *H05B 47/155* (2020.01); *H05B 47/16* (2020.01); *H05B 47/19* (2020.01)

(58) Field of Classification Search
CPC ...... H05B 47/165; H05B 47/19; H05B 47/16; H05B 47/155
See application file for complete search history.

(56) References Cited

U.S. PATENT DOCUMENTS

| | | | | |
|---|---|---|---|---|
| 8,890,435 B2 | 11/2014 | Bora et al. | | |
| 9,295,144 B2 | 3/2016 | Bora et al. | | |
| 2013/0063042 A1* | 3/2013 | Bora | ...................... | H05B 45/37 315/292 |

OTHER PUBLICATIONS doityourselfchristmas.com; "Helix"; Webpage located at: https://www.doityourselfchristmas.com/wiki/index.php?title=Helix; Jan. 29, 2011; accessed on Nov. 13, 2024.

* cited by examiner

*Primary Examiner* — Henry Luong
(74) *Attorney, Agent, or Firm* — MASCHOFF BRENNAN

(57) ABSTRACT

A method for implementing a lighting program by a plurality of smart lights is disclosed. The method may include receiving, from a controller, one or more parameters of a lighting program at a plurality of smart lights. Each smart light may have a light index. The method may also include storing the one or more parameters of the lighting program, receiving, from the controller, a preliminary synchronization signal, and initiating a timer based on the preliminary synchronization signal. The method may further include configuring a rendering algorithm based on input including at least the light index, the one or more parameters of the lighting program, and a current time on the timer, executing the rendering algorithm to determine a frame value, and implementing a lighting output consistent with the determined frame value.

15 Claims, 9 Drawing Sheets

DISTRIBUTED LIGHTING PROGRAM IMPLEMENTATION AND COLOR CORRECTION

CROSS-REFERENCE TO RELATED APPLICATION

This application claims the benefit of and priority to U.S. Patent Application Ser. No. 63/599,951, filed on Nov. 16, 2023, the disclosure of which is incorporated herein by reference.

BACKGROUND

Lights are commonly used to illuminate both indoor and exterior areas, such as along footpaths, at the base of trees, or on roof eaves. In some indoor/outdoor lighting systems, a controller sends instructions to one or more lights, which controls whether the lights are on or off and, in some systems, what color to illuminate and a pattern to follow. In these systems, the controller may be electrically coupled to the lights through hardwired connections. For example, a simple lighting system may include red lights that blink on and off at uniform intervals.

Hardwired connections between a controller and lights, however, may be impractical in some lighting system. For example, in an outdoor lighting system that covers a large area, hardwired connections between individual lights and a controller may be too expensive to be practical. Thus, wireless systems have evolved in which lights are turned on and off through wireless commands sent from a centralized controller.

Lighting systems that are controlled through a wireless connection with a centralized controller, however, often suffer from slow communication speeds. These slow communication speeds increase overall system latency. In systems where lighting commands are sent one at a time chronologically, slow communication speeds can severely limit the ability to create desired lighting effects. This is especially true in cases where a controller is implementing a lighting program that includes separate instructions or "frames" for turning lights on and off in rapid intervals. For example, in a "racing" program where a light appears to move from one place to another through rapid intervals of lights turning on and off, any system latency will be noticeable and diminish the desired effect.

In addition to these latency issues, lights that are configured to emit different colors, such as light emitting diodes, may experience "thermal color drift" where the actual color output of the light changes due to a temperature of the light. This thermal drift can also diminish a desired effect of a light program that requires specific colors to be illuminated.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address the problems experienced in conventional outdoor lighting systems, including problems associated with slow communication speeds and thermal color drift.

In one embodiment, a method for implementing a lighting program by a plurality of smart lights is disclosed. The method may include receiving, from a controller, one or more parameters of a lighting program at a plurality of smart lights. Each smart light may have a light index. The method may also include storing the one or more parameters of the lighting program, receiving, from the controller, a preliminary synchronization signal, and initiating a timer based on the preliminary synchronization signal. The method may further include configuring a rendering algorithm based on input including at least the light index, the one or more parameters of the lighting program, and a current time on the timer, executing the rendering algorithm to determine a frame value, and implementing a lighting output consistent with the determined frame value.

In some embodiments, the method may further include transmitting, from the plurality of smart lights to the controller, a confirmation of receipt of the one or more parameters of the lighting program. In these embodiments, the confirmation of receipt of the one or more parameters of the lighting program may be wirelessly transmitted to the controller as a modified 2.4 GHz WiFi packet.

In some embodiments, the method may further include receiving, from the controller, an updated synchronization signal, determining whether the current time on the timer and a time in the updated synchronization signal match, and—when the current time on the timer and the updated synchronization signal do not match—updating the timer to be consistent with the updated synchronization signal.

In some embodiments, the rendering algorithm may be executed with an updated current time input at predetermined intervals to determine the frame value. In these embodiments, the predetermined intervals may provide for at least 60 separate lighting output values to be determined every second.

In some embodiments each smart light in the plurality of smart lights may have a unique light index.

In some embodiments, one or more non-transitory computer-readable media may comprise one or more computer-readable instructions that, when executed by one or more processors of a computing device, cause the computing device to perform a method for implementing a lighting program by a plurality of smart lights.

In some embodiments, a computing device comprising one or more processors and one or more non-transitory computer-readable media comprising one or more computer-readable instructions that, when executed by the one or more processors, may cause the computing device to perform a method for implementing a lighting program by a plurality of smart lights.

In another embodiment, a method for active thermal correction is provided. The method may include receiving, at a lighting device, an instruction to render a target color at a desired level of intensity, wherein a plurality of color channels are required to render the target color, rendering the target color at the desired intensity level based on values for the plurality of color channels at default color characteristics, determining a current temperature for each color channel within the plurality of color channels, determining a thermal color drift for each color channel within the plurality of color channels based on the current temperature, identifying a diminished intensity percentage for the color channel that is most affected by thermal color drift, decreasing a drive current to the color channels that are not most affected by thermal color drift by an amount that compensates for the thermal color drift so that an actual target color is rendered or increasing a drive current to the color channel that is most affected by thermal color drift by an amount that compensates for the thermal color drift so that an actual target color is rendered, and rendering the actual target color.

In yet another embodiment, a method for active thermal correction may include receiving an instruction to render a target color at a desired level of intensity, wherein one or more color channels may be required to render the target color, rendering the target color at the desired intensity level based on a priority associated with each color channel and at default color characteristics, wherein color channels with highest priorities are relied upon to render the desired color first for the plurality of color channels, determining a current temperature for all color channels in the light, determining a thermal color drift for each color channel based on the current temperature, determining how to render the target color using output characteristics for each color channel after an adjustment for thermal drift; decreasing a drive current to one or more color channels by an amount that compensates for the thermal color drift so that an actual target color is rendered or increasing a drive current to one or more color channels by an amount that compensates for the thermal color drift so that an actual target color is rendered or increasing a drive current to one or more color channels and decreasing a drive current to one or more color channels by amounts that compensate for the thermal color drift so that an actual target color is rendered, and rendering the actual target color.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Embodiments of the present disclosure are explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
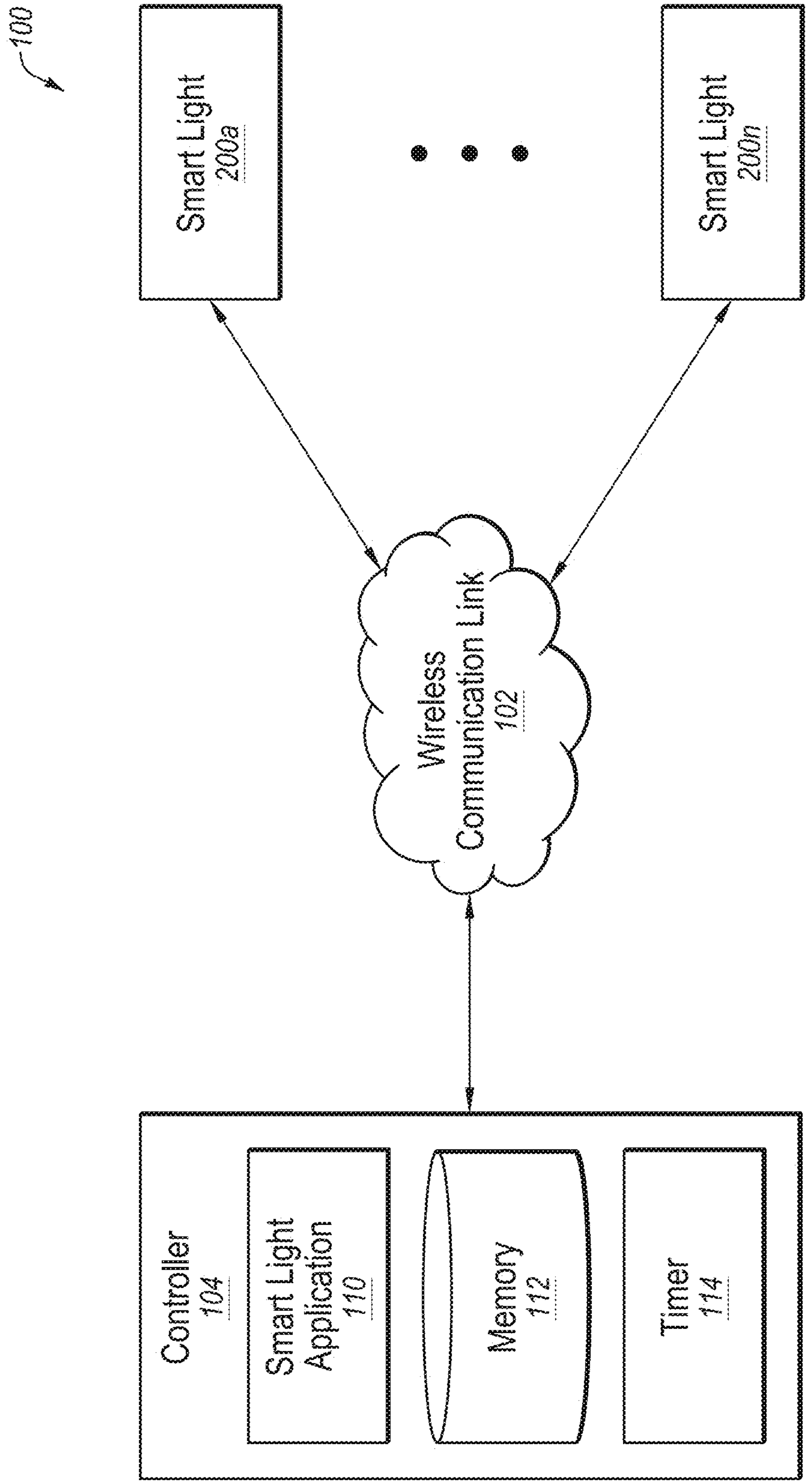
FIG. 1 illustrates an example system configured for implementing a lighting program.

FIG. 1 illustrates an example system 100 configured for implementing a lighting program. The system 100 includes a wireless communication link 102, a controller 104, and smart lights 200*a*-200*n*. In some embodiments, the wireless communication link 102 may use any wireless communication protocol to communicatively couple the controller 104 with the smart lights 200*a*-200*n*. In some embodiments, the wireless communication protocol may include Wi-Fi®, Bluetooth®, Bluetooth Low Energy®, Zigbee®, or WiMax®. In other embodiments, the wireless communication protocol may be a network, or combination of multiple networks, configured to send and receive communications between systems and devices. For example, the wireless communication protocol may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 6:
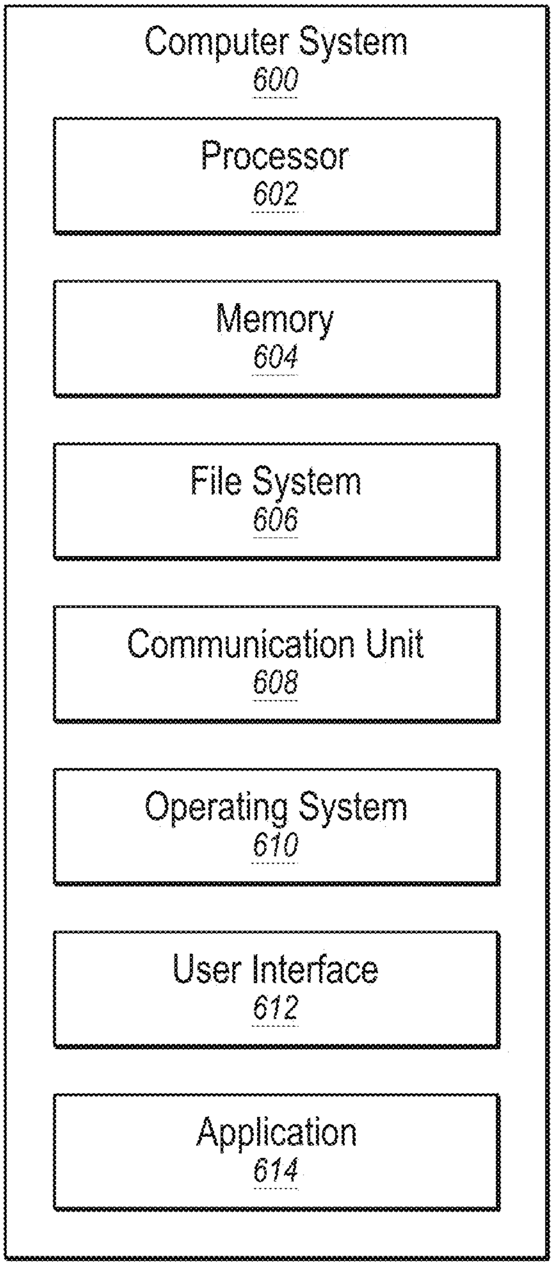
FIG. 6 illustrates an example computer system that may be employed in implementing a lighting program.

In some embodiments, the controller 104 may be any computer system capable of communicating over the wireless communication link 102, examples of which are disclosed herein in connection with the computer system 600 of FIG. 6. The controller 104 includes a smart light application 110 that is configured to identify and send one or more parameters of a lighting program to the smart lights 200*a*-200*n*. In one specific embodiment, the controller 104 may send one or more parameters of a lighting program to the smart lights 200*a*-200*n* as a modified 2.4 Giga Hertz (GHz) Wi-Fi® packet.

A lighting program may include number of different elements, including but not necessarily limited to a color pattern, one or more effects, and a value associated with each effect. These color patterns, effects, and values may be represented by one or more parameters that are associated with the lighting program. A color pattern may be an ordered list of colors. For example, a lighting program may include a red, yellow, and blue color pattern. The list of colors in a color pattern may include any number of different colors (but must include at least one color). In some embodiments, a color pattern in a lighting program may include only two or three colors, but in other embodiments, a color pattern in a lighting program may include a hundred colors, or more.

The effects of a lighting program may include a display pattern for the lights in the color pattern. This effect or display pattern may include, for example, blink, fade, strobe, chase, twinkle, lightning, ping pong, gradient, bars, melt, wipe, random, shimmer, sparkle, etc. Any number of different effects may be included in a lighting program. Each of the effects may also be associated with one or more values. A value may include some characteristic of the effect. For example, a value may be a frequency of the effect, a speed of the effect, an intensity of the effect, a number of lights that participate in the effect, or some other characteristic of the effect. In one embodiment, a value may include a beats per minute count that would allow an effect to synchronize with the tempo of a song or music. Different effects may have specific values available for selection. For example, a twinkle effect may include two possible values, a first value may determine how frequently the lights twinkle and a second value may determine how fast they twinkle. A value for a ping pong effect may identify how far in each direction the lights travel when rendering this effect. A value for a chase effect may identify a length of the effect (how far the lights go) or the direction that the lights appear to travel.

Lighting programs need not include any effects. In some embodiments, a lighting program may be limited to just a color pattern. In these embodiments, a display of lights may not include any effects, but may simply be a continuous uninterrupted display of the light colors in the color pattern. Alternatively, in some embodiments, a lighting program may implement more than one effect. For a lighting program may implement both a chase and a fade effect.

The controller 104 also includes a memory 112. The memory 112 may store one or more lighting program parameter presets, which may be selected by a user through an input mechanism on the controller 104. For example, in some embodiments, the smart light application 110 may present a number of different lighting program parameter presets (stored in the memory 112) from which a user may select. For example, a stored preset of lighting program parameters may result in a red blink or a blue chase. In other embodiments, a user may create his or her own customized lighting program parameter presets by identifying desired set of parameters, including color pattern, one or more effects (if desired), and (if effects are selected) a value for each effect. In some embodiments, an effect may not include a value or may have a value of zero. These customized lighting program parameter presets may also be stored in the memory 112 for selection at some time subsequent to their creation.

The controller 104 also includes a timer 114. The timer 114 may be similar to a stopwatch. The controller 104 may be configured to start and stop the timer 114 at desired times. For example, in one embodiment the timer 114 may be configured to start when lighting program parameters are sent to the smart lights 200*a*-200*n* or when a preliminary synchronization signal is sent to the smart lights 200*a*-200*n*. The timer 114 may be configured to stop or reset at the end of a lighting program.

Once lighting program parameters are selected at the controller, the controller may transmit them, along with a preliminary synchronization signal, to the smart lights 200*a*-200*n* for display. As provided in more detail hereafter, the smart lights 200*a*-200*n* may employ a deterministic rendering algorithm to execute a lighting program.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, the memory 112 (or other components of the controller 104) may exist on a device that is external to the controller 104. In this embodiment, the controller 104 may access the lighting programs stored on the external memory through a wired or wireless communication. For example, the controller may access the external memory through one of the wireless communication protocols that are part of the wireless communication link 102.

Figure 2:
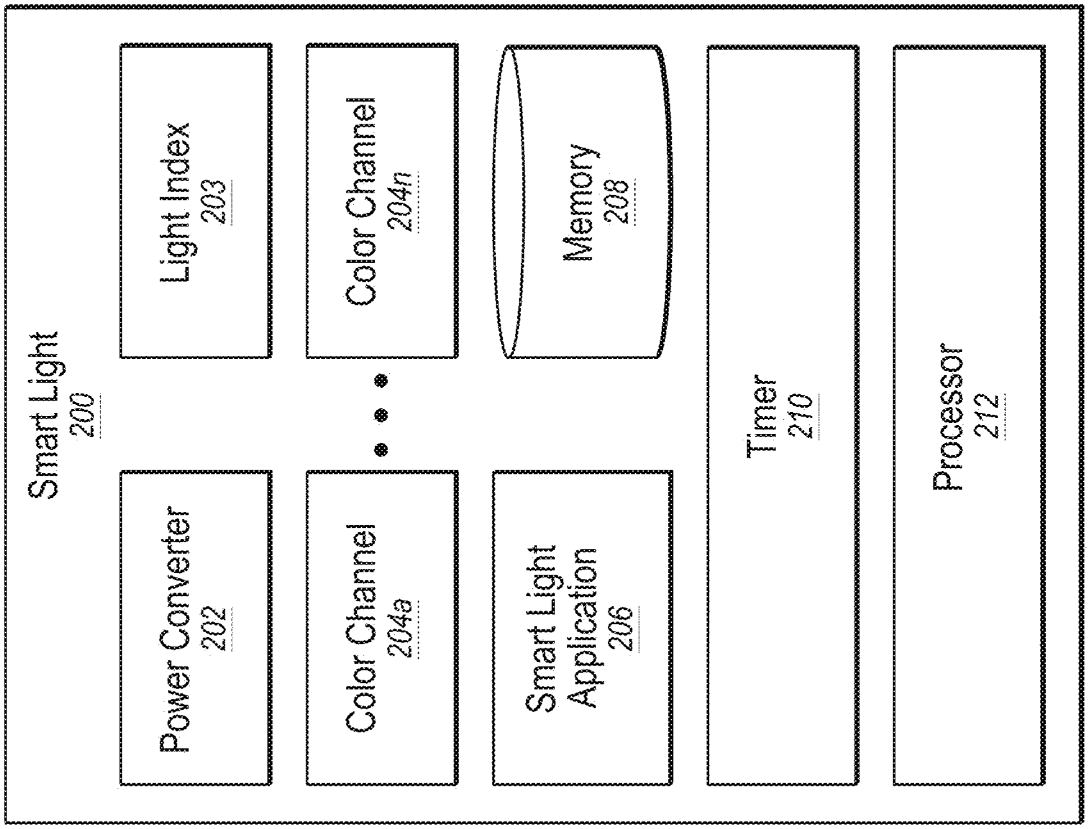
FIG. 2 illustrates an example smart light that may be used in implementing a lighting program.

FIG. 2 illustrates an example smart light 200 that may be used in implementing a lighting program. The smart light 200 may be any of the smart lights within the group of smart lights 200*a*-200*n* illustrated in FIG. 1. The smart light 200 includes a power converter 202 for converting power received from a power source into a desired power output. For example, the smart light 200 may require a specific power to function. The power converter 202 may convert the received power, which may be received in a variety of different voltages and forms (alternating current or direct current), into the specific power that is required for the smart light 200 to function properly.

The smart light 200 includes a light index 203. In some embodiments, each smart light in a lighting system may include a unique light index. In other embodiments, some or all of the smart lights in a lighting system may share the same light index. This light index may be a symbol or an alphanumeric character, such as a number, that identifies each smart light within the system. Light indices may also be a series of numbers, such as coordinates in a two- or three-dimensional space that identify locations of the lights in the system. In one embodiment, light indices may be assigned during an initial set up process in which the smart lights 200*a*-200*n* are paired with the controller 104. For example, smart lights 200*a*-200*n* may be numerically indexed chronologically based on the order in which they paired to the controller 104. In some embodiments, the light indices assigned to smart lights in a system may be changed by a user subsequent to pairing with the controller 104.

The smart light 200 also includes a plurality of color channels 204*a*-204*n*. These color channels may include one or more lighting elements, such as light emitting diodes (LEDs), that are each configured to illuminate a different color. Any number of different color channels may be included in a smart light. In one embodiment, a smart light may include 5 different color channels each including a single lighting element comprising a yellow LED, a red LED, a blue LED, a green LED, and a violet LED. Colors from these color channels may be mixed in order to achieve additional color outputs from the smart light 200.

The smart light 200 also includes a smart light application 206. The smart light application 206 may be configured to communicate with an external source, such as the controller 104. The smart light 200 may receive data, such as one or more parameters of a lighting program and a synchronization signal from the controller 104. The smart light may also transmit data to the controller 104, such as a confirmation that lighting program parameters have been received. Each of these transmissions may, in one embodiment, be sent and received as modified 2.4 GHz Wi-Fi® packets over the wireless communication link 102.

The smart light 200 also includes a memory 208. The smart light 200 may use the memory 208 to store parameters of a lighting program and other data that is received from an external source, such as the controller 104. The memory may also store one or more rendering algorithms for determining frame values.

The smart light 200 also includes a timer 210. The timer 210 may be similar to a stopwatch. The smart light 200 may be configured to start and stop the timer 210 at desired times. For example, in one embodiment the timer 210 may be configured to start when a preliminary synchronization signal is received from the controller 104. The smart light 200 may receive updated synchronization signals from the controller 104 to ensure that the timer 210 is synchronized, or is tracking time in unison with the controller 104.

The smart light 200 also includes a processor 212. The processor 212 may be configured to implement a lighting program. To do this, the processor 212 may configure a rendering algorithm based on input including one or more of the light index 203, one or more parameters of a lighting program, and a current time on the timer 210. In some embodiments, input may not include parameters of a lighting program. In these embodiments, a smart light may be configured to display a single color pattern, such as red, and a single effect, such as a blink. The rendering algorithm within this smart light may only require a light index and a time to determine how to implement the red blink program.

Based on these inputs (and potentially more or less), the rendering algorithm implemented by the smart light 200 may output a frame value that indicates whether the light should be illuminated and if so, with what color and what effects, if any. The rendering algorithm may be time deterministic such that at a given time, the rendering algorithm will always output the same frame value for a given smart light.

Provided below are examples of frame generation algorithms where each frame consists of three floating point values, each falue representing the normalized intensity of a red, green, and blue component. For illustrative purposes, these examples only affect the 'color' of the returned frame such as to have the frame either represent a light as on (white) or off.

The following is an example of a rendering algorithm that produces a blinking effect of a white light at 1 Hz:

```
function generateFrame(timeMs):
  timeMs=timeMs % (1000+1)
    if timeMs>500:
    return {1, 1, 1}//full brightness white
  else:
    return {0, 0, 0}//off
```

By allowing cycleDurationMs to be configured as a parameter to this rendering algorithm, the frequency at which the lights blink can be modified as follows:

```
static cycleDurationMs=1000
function generateFrame(timeMs):
  timeMs=timeMs % (cycleDurationMs+1)
  if timeMs>cycleDurationMs/2:
    return {1, 1, 1}//full brightness white
  else:
    return {0, 0, 0}//off
```

In another example, by adding configurable 'alternate' and 'index' parameters, modification of the parameters to the rendering algorithm can result in every alternating light be on/off, or having all lights blink in unison:

```
static cycleDurationMs=1000
static alternate=true
static index=0
function generateFrame (timeMs):
  timeMs=timeMs % (cycleDurationMs+1)
  isOn=timeMs>cycleDurationMs/2
  if alternate and index % 2==0:
    isOn=!isOn//invert the 'on' state based on the index
  if isOn:
    return {1, 1, 1}//full brightness white
  else:
    return {0, 0, 0}//off
```

Each light in the system (smart lights 200*a*-200*n*) may implement the same rendering algorithm so that the lights in the system implement the selected light program. In embodiments where each light in the lighting program has a different light index, at any given time, the frame values of the rendering algorithm for each light in the light system may be different. To the extent that multiple lights have the same light index, these lights may have the same frame values and therefore the same output.

While the rendering algorithm may be time deterministic, there are some effects that may be selectively randomized. Thus, there may be some randomized modifications to the deterministic output of the rendering algorithm for certain effects. For example, the output of a lightning effect may be randomized such that its rendering is not predictable, but is more similar to actual lightning, which is unpredictable.

Figure 3:
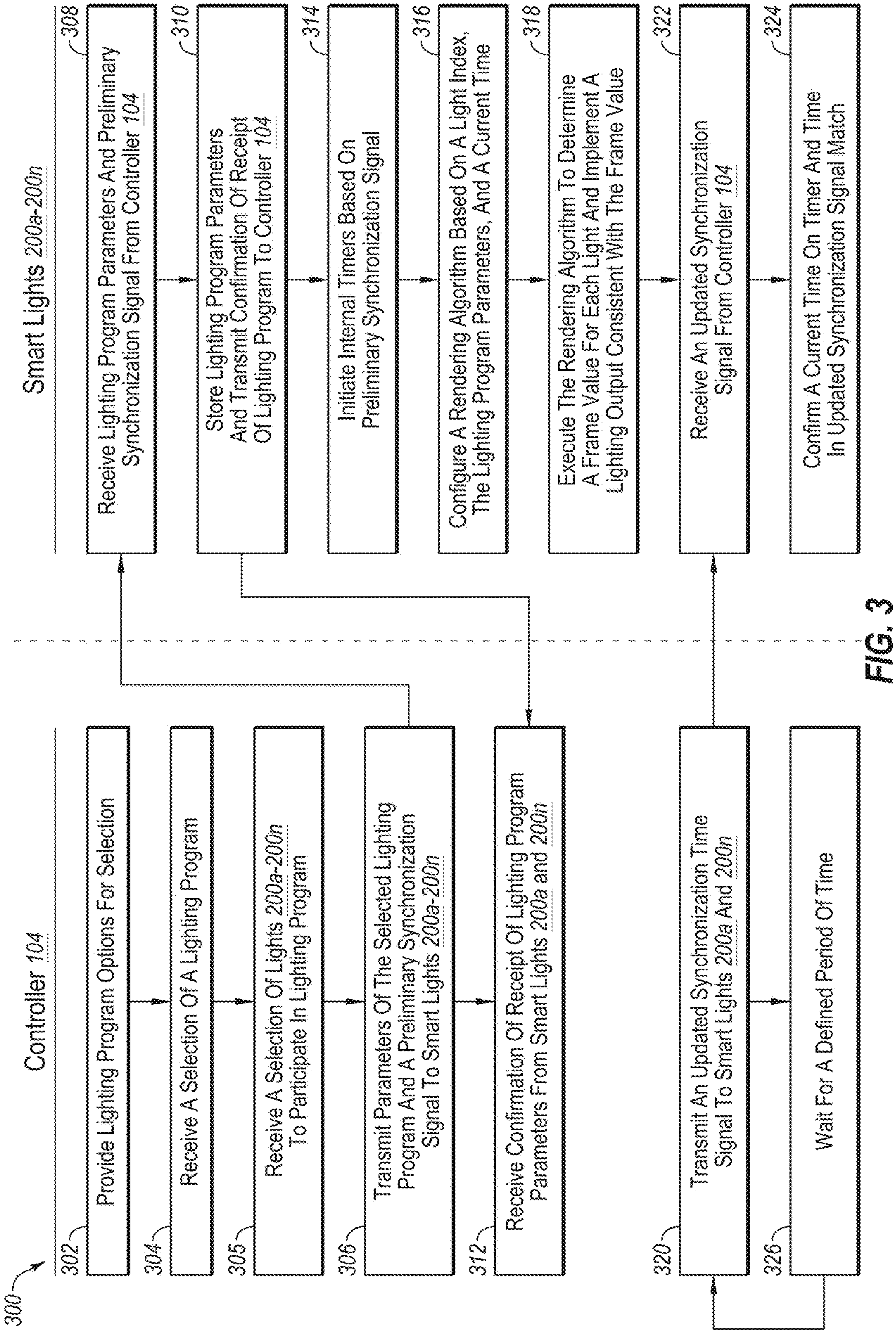
FIG. 3 illustrates a process flow diagram for implementing a lighting program.

FIG. 3 illustrates a process flow diagram 300 for implementing a lighting program in a lighting system. The flow diagram 300 identifies steps that are performed by the controller 104, and the smart lights 200*a*-200*n*, which are illustrated in FIG. 1. In a first step 302, the controller 104 provides lighting program options for selection. For example, the controller 104 may include a display and an input mechanism that allows a user to select a desired lighting program to be implemented by the smart lights 200*a* and 200*b*. Alternatively, a user may create his or her own custom lighting program through inputs on the controller 104. Regardless of the type of lighting program (pre-defined or custom), a lighting program selection is received at the controller at a step 304.

At a step 305, the controller 104 receives a selection of lights that the user wants to participate the lighting program. A user may limit the number of lights in a lighting system to participate in a lighting program to some subset of lights. For example, a lighting system may include 10 smart lights and the user may want lights 1-5 to participate in the selected lighting program. In other embodiments, smart lights may be designated as part of "zones," which a user may select. For example, a first zone may include lights on an eave of a roof while a second zone may include landscape lights on trees, and a third zone may include lights that follow an outdoor footpath. One or more of these zones may be selected by a user for a desired lighting program.

At a step 306, the controller 104 transmits one or more parameters of the selected lighting program and a preliminary synchronization signal to the smart lights 200*a*-200*n*. In some embodiments, the controller 104 may send the parameters of the lighting program to all of the smart lights in the system regardless of the selection of lights in the step 304. In other embodiments, the controller 104 may only send the parameters of the lighting program to the subset of smart lights that are selected in the step 305 to participate in the lighting program. Regardless of whether the parameters of the lighting program are sent to all smart lights in a system or only to a subset or zone of lights selected, the same lighting program parameters are sent and received by the smart lights. In other words, different lighting program parameters are not sent to different participating lights. The lighting program parameters are the same.

In addition to the lighting program, the controller 104 may also send a preliminary synchronization signal to the smart lights 200*a*-200*n*. The lighting program and preliminary synchronization signal may be sent to the smart lights 200*a*-200*n* as part of the same transmission or in different transmissions. The preliminary synchronization signal (as well as any subsequent synchronization signals sent) may include a current time at the controller 104. The preliminary synchronization signal may cause the smart lights 200*a*-200*n* to initiate their own internal timers 210 so that they are in unison with the timer 114 in the controller 104. In one embodiment, the preliminary synchronization signal may be zero and the controller 104 may send the lighting program parameters and preliminary synchronization signal as modified 2.4 GHz Wi-Fi® packets.

In a step 308, the smart lights 200*a*-200*n* may receive the transmission of the lighting program parameters and preliminary synchronization signal. In one embodiment, the controller 104 may transmit the lighting program parameters directly to each of the smart lights 200*a*-200*n*. In another embodiment, the controller 104 and smart lights 200*a*-200*n* may be part of a mesh network such that the controller 104 transmits the lighting program parameters directly to a first smart light and then the first smart light transmits the lighting program another smart light 200 within the system.

Once the smart lights 200_a_-200_n_ receive the lighting program parameters and the preliminary synchronization signal, they may store the lighting program parameters in internal memories 208 and transmit confirmation of receipt of the lighting program parameters to the controller 104 in a step 310. In one embodiment, the smart lights 200_a_-200_n_ may each transmit this confirmation to the controller 104 directly. In another embodiment, a mesh network may be used so that one or more smart lights may transmit their confirmations to the controller 104 indirectly, through another smart light that is more proximate to the controller 104. In a step 312, the controller 104 may receive the confirmation of receipt from the smart lights 200_a_ and 200_b_.

In embodiments where the controller 104 does not receive confirmation back from all of the smart lights 2020_a_-200_n_, the controller 104 may resend the lighting program parameters out to all of the smart lights 200_a_-200_n_. In other embodiments, the controller 104 may only send the lighting program parameters to the smart light(s) from which a confirmation was not received. Thus, for example, if the controller 104 receives confirmation of receipt from the smart light 200_a_ in the step 312, but does not receive a confirmation of receipt from a smart light 200_b_, the controller may either resend the lighting program parameters to both of smart lights 200_a_ and 200_b_, or it may just resend the lighting program parameters to the smart light 200_b_.

Along with sending a confirmation of receipt, the smart lights 200_a_-200_n_ may also initiate their internal timers 210 in a step 314. The internal timers 210 may be initiated based on the synchronization signal so that the timers 210 are in unison with the timer 114 in the controller 104.

In a step 316, the smart lights 200_a_-200_n_ may configure a time deterministic rendering algorithm based on each light's light index 203, the lighting program parameters, and a current time from timers 210. Based on these inputs, in a step 318, the rendering algorithm may be executed by the smart lights 200_a_-200_n_ to determine a frame value for each light and the smart lights 200_a_-200_n_ may implement a lighting output that is consistent with the determined frame value. The frame values determined by each smart light 200_a_-200_n_ may indicate whether a light should be illuminated and if so, with what color and what effect. Each smart light 200_a_-200_n_ may execute the rendering algorithm with an updated current time value at predetermined intervals to determine new frame values. The predetermined interval may be any amount of time. In some embodiments, the predetermined interval provides for at least 30 separate frame values to be determined every second. For example, a predetermined interval may provide for 60 or 90 frame values to be determined every second. In other embodiments, the predetermined interval may provide for less than 30 separate frame values to be determined every second.

In a step 320, the controller 104 transmits an updated synchronization signal that includes a current time on the timer 114 of the controller 104 to the smart lights 200_a_-200_n_, which they receive in a step 322. Upon receiving the updated synchronization signal, the smart lights 200_a_-200_n_ may confirm that the current time on their timers 210 are in unison with the timer 114 of the controller 104. To the extent that that a timer 210 is not in unison with the updated synchronization signal, that smart light may update its timer 210 so that it is in unison with the timer 114 of the controller 104. In a step 326 the controller may wait for a defined period of time before transmitting another updated synchronization time signal to the smart lights 200_a_-200_n_ and repeating the steps 320, 322, and 324.

The smart lights 200_a_-200_n_ may continue to execute the rendering algorithm until they receive a stop signal from the controller 104. Upon termination of the lighting program, the smart lights 200_a_-200_n_ may delete the lighting program parameters from their memories 208 and await a transmission of new lighting program parameters and a new preliminary synchronization signal from the controller 104. In other embodiments, the smart lights 200_a_-200_n_ may retain the lighting program parameters in their memories 208 until space is needed for storage of new lighting program parameters.

Figure 4:
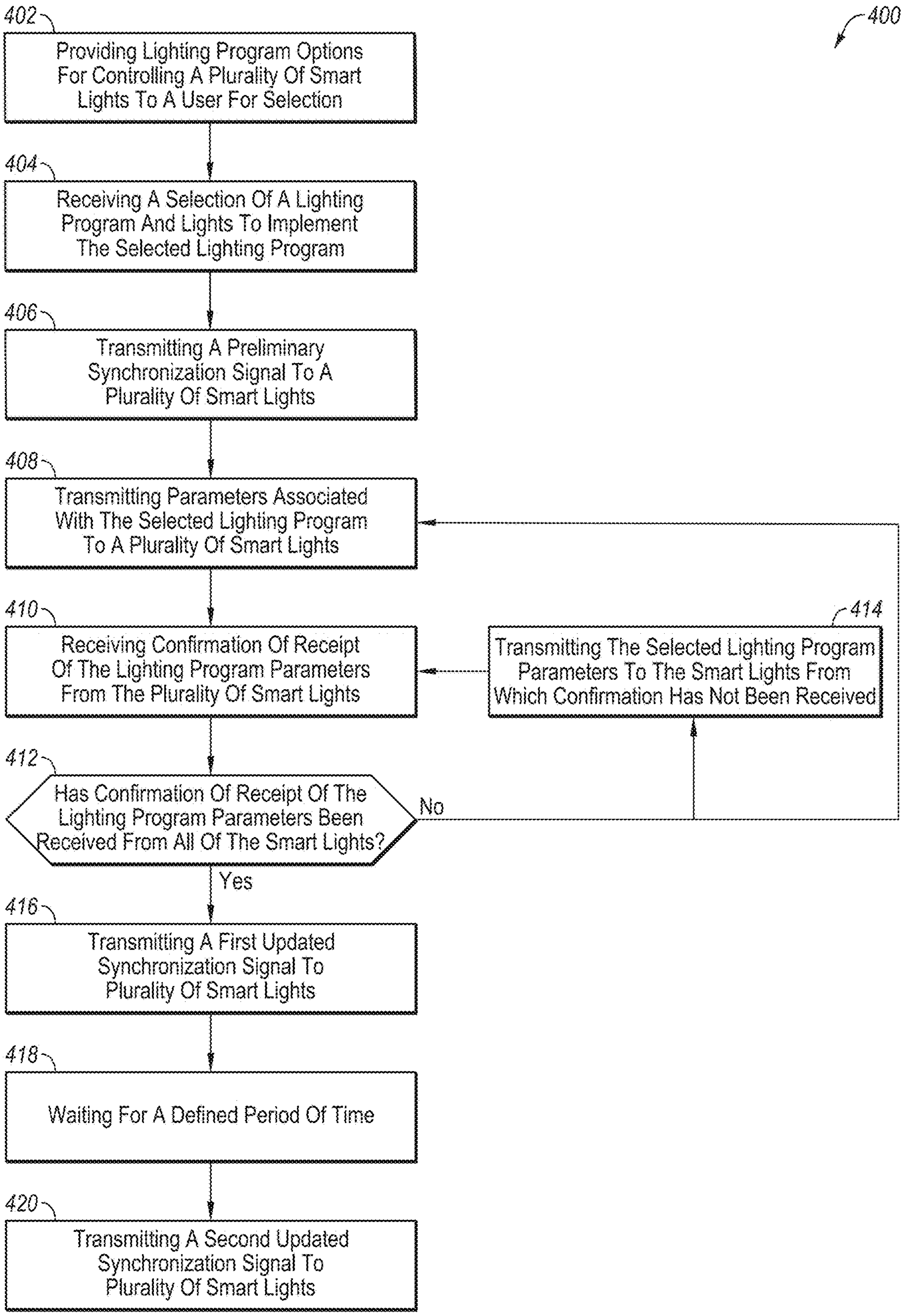
FIG. 4 illustrates a flowchart of an example method, performed by a controller, for implementing a lighting program.

FIG. 4 illustrates a flowchart of an example method 400, implemented by a controller, for implementing a lighting program. The method 400 may be performed, in some embodiments, by a device or system, such as by the controller 104 of FIG. 1. In these and other embodiments, the method 400 may be performed by one or more processors based on one or more computer-readable instructions stored on one or more non-transitory computer-readable media.

The method 400 may include, at step 402, providing lighting program options for a plurality of smart lights to a user for selection. Lighting programs may include any number of different elements including a color pattern, one or more effects, and a value associated with each effect. A color pattern may be an ordered list of any number of different colors. An effect may be any display pattern for the lights in the color pattern, such as blinking. Each of the effects may also be associated with a value that defines some parameter of the effect. For example, a value may be a frequency of the effect, a speed of the effect, an intensity of the effect, a number of lights that participate in the effect, or some other characteristic of the effect.

The method 400 may include, at step 404, receiving a selection of a lighting program and the lights to implement the selected lighting program. The lighting program selected may be a set program that already exists, or it may be a customized user defined program. A user may limit the number of smart lights within a system to participate in the program. For example, some subset of lights within the system may be selected to participate in the lighting program.

The method 400 may include, at step 406, transmitting a preliminary synchronization signal to a plurality of smart lights. The preliminary synchronization signal may be a current time signal on an internal timer of the controller. In some embodiments, the controller may restart its internal timer when it sends the preliminary synchronization signal, such that the preliminary synchronization signal is zero.

The method 400 may include, at step 408, transmitting one or more parameters associated with the selected lighting program to a plurality of smart lights. The lighting program parameters may be transmitted over any wireless communication protocol. In one embodiment the lighting program parameters are sent as a modified 2.4 GHz Wi-Fi® packet. The method 400 may include, at step 410, receiving confirmation of receipt of the lighting program parameters from the plurality of smart lights. This confirmation may also be received over any wireless communication protocol. In one embodiment the confirmation of receipt is sent as a modified 2.4 GHz Wi-Fi® packet.

The method 400 may include, at step 412, determining whether a confirmation of receipt has been received from each of the smart lights within the plurality of smart lights. If a confirmation has not been received from one or more of the smart lights, the step 408 may be repeated and the lighting program parameters may be resent to the plurality of smart lights. In another embodiment, in a step 414, the lighting program parameters may be transmitted to only those smart lights from which a confirmation of receipt was not received.

The method 400 may include, at step 416, transmitting a first updated synchronization signal to the plurality of smart lights. The first updated synchronization signal may simply be a current time on the timer of the controller. In one embodiment the current time signal is sent as a modified 2.4 GHz Wi-Fi® packet. The method 400 may include, at step 418, waiting a period of time before, in step 420, a second updated synchronization signal is transmitted to the plurality of smart lights. This process may be repeated until the time at which the lighting program ends. Updated synchronization signals may be transmitted after waiting any period of time. In some embodiments, updated synchronization signals may be sent to the plurality of smart lights every second, or at a fraction of a second.

Although the steps of the method 400 are illustrated in FIG. 4 as discrete actions, various steps may be divided into additional steps, combined into fewer steps, reordered, expanded, or eliminated, depending on the desired implementation. For example, in one embodiment, the selected lighting program may be sent prior to the preliminary synchronization signal.

Figure 5:
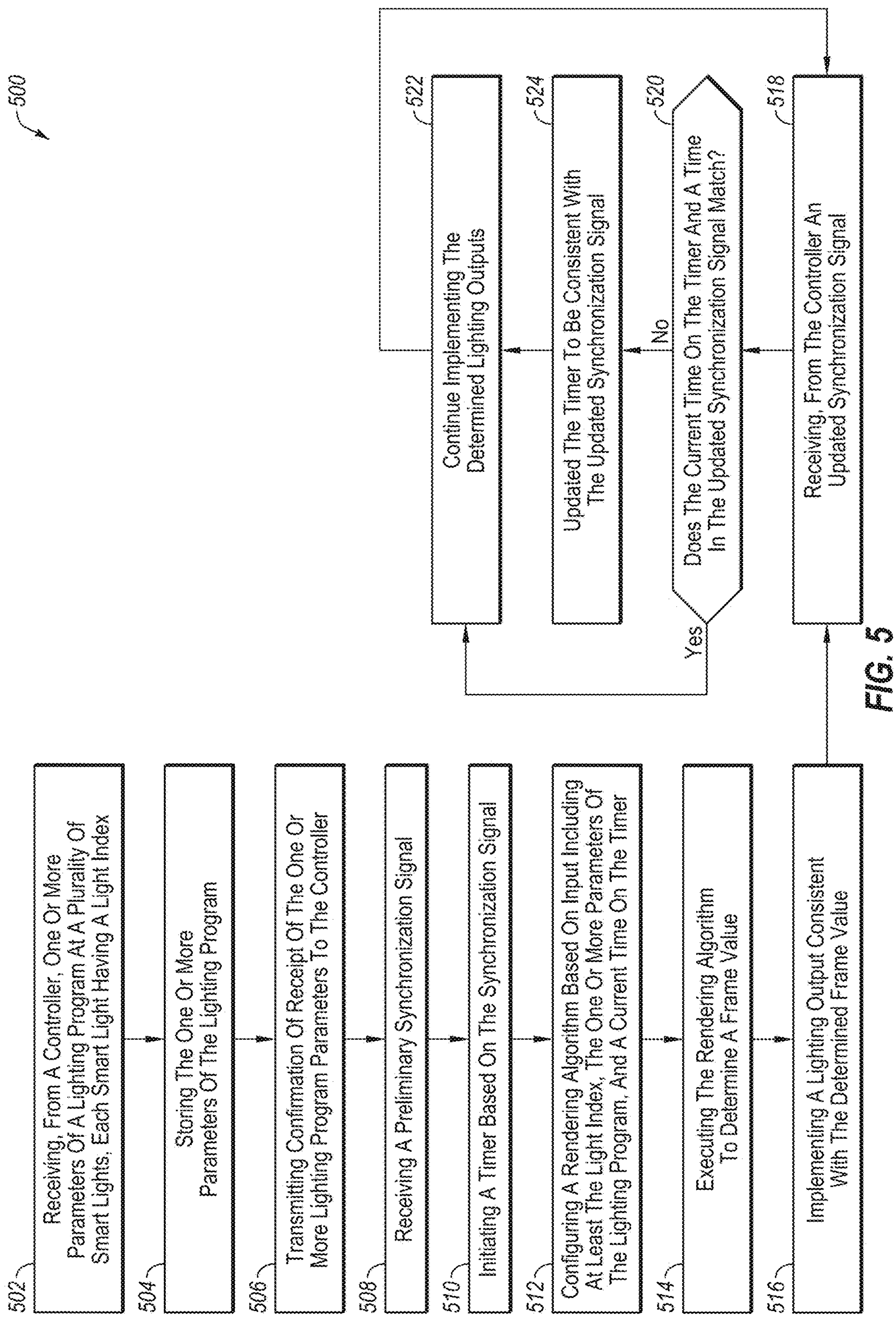
FIG. 5 illustrates a flowchart of an example method, performed by a smart light, for implementing a lighting program.

FIG. 5 illustrates a flowchart of an example method 500, implemented by a smart light, for implementing a lighting program. The method 500 may be performed, in some embodiments, by a device or system, such as by the smart lights 200*a*-200*n* of FIGS. 1 and 2. In these and other embodiments, the method 500 may be performed by one or more processors based on one or more computer-readable instructions stored on one or more non-transitory computer-readable media.

The method 500 may include, at step 502, receiving, from a controller, one or more lighting program parameters at a plurality of smart lights, each smart light having a light index. The lighting program parameters may define several elements including a color pattern, effects, and values associated with the effects. The method 500 may include, at step 504, storing the lighting program parameters.

The method 500 may include, at step 506, transmitting confirmation of receipt of the lighting program parameters to the controller. In one embodiment the confirmation of receipt may be sent as a modified 2.4 GHz Wi-Fi® packet.

The method 500 may include, at step 508, receiving a preliminary synchronization signal. This preliminary synchronization signal may represent a current time at a controller from which the preliminary synchronization signal is received. In some embodiments, the preliminary synchronization signal may, but need not, indicate a time of zero. Upon receipt of the preliminary synchronization signal, the smart light may initiate its own internal timer based on the preliminary synchronization signal in a step 510, such that the smart light internal timer is in unison with the controller.

The method 500 may include, at step 512, configuring a rendering algorithm based on input including one or more of the unique light index, the lighting program parameters, and a current time on the timer. The method 500 may include, at step 514, executing the rendering algorithm to determine a frame value and implementing a lighting output consistent with the frame value in a step 516.

The method 500 may include, at step 518, receiving from the controller an updated synchronization signal. Upon receiving the updated synchronization signal from the controller, a determination may be made, at step 520, whether the lighting program frames are being executed on time. To do this, the smart light may simply compare the current time signal received from the controller (which is included in the updated synchronization signal) with the time on the timer of the smart light. To the extent that there is a difference, at step 524, the smart light may update its timer with the current time from the controller so that the smart light and controller timer are synchronized.

The method 500 may include, at step 522, continuing implementing determined frame values, based on the rendering algorithm. The rendering algorithm may be executed periodically with new current time signals. In some embodiments, the rendering algorithm may be executed more than 30 times every second. For example, the rendering algorithm may be executed 60 or 90 or more times per second. The smart light will continue rendering the frame values until a stop signal is received. In some embodiments, when a stop signal is received, the smart light may delete the lighting program parameters from the memory and the timer may be reset. In other embodiments, the smart light may retain the lighting program parameters until new lighting program parameters are received and additional memory space is required for storage of the new lighting program parameters.

Although the steps of the method 500 are illustrated in FIG. 5 as discrete actions, various steps may be divided into additional steps, combined into fewer steps, reordered, expanded, or eliminated, depending on the desired implementation.

FIG. 6 illustrates an example computer system 600 that may be employed in implementing a lighting program. In some embodiments, the computer system 600 may be part of any of the systems or devices described in this disclosure. For example, the computer system 600 may be part of any of the controller 104 and the smart lights 200*a*-200*n*.

The computer system 600 may include a processor 602, a memory 604, a file system 606, a communication unit 608, an operating system 610, a user interface 612, and an application 614, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 602 may include any suitable special-purpose or general-purpose computer, computing entity, or processing device including various computer hardware or software applications and may be configured to execute instructions stored on any applicable computer-readable storage media. For example, the processor 602 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 602 may interpret and/or execute program instructions and/or process data stored in the memory 604 and/or the file system 606. In some embodiments, the processor 602 may fetch program instructions from the file system 606 and load the program instructions into the memory 604. After the program instructions are loaded into the memory 604, the processor 602 may execute the program instructions. In some embodiments, the instructions may include the processor 602 performing one or more of the steps of the methods disclosed herein.

The memory 604 and the file system 606 may include computer-readable storage media for carrying or having stored thereon computer-executable instructions or data structures. Such computer-readable storage media may be any available non-transitory media that may be accessed by a general-purpose or special-purpose computer, such as the processor 602. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 602 to perform a certain operation or group of operations, such as one or more of the steps of the methods disclosed herein. These computer-executable instructions may be included, for example, in the operating system 610, in one or more applications, such as the smart light applications 110 and 206.

The communication unit 608 may include any component, device, system, or combination thereof configured to transmit or receive information over a network, such as the wireless communication link 102 of FIG. 1. In some embodiments, the communication unit 608 may communicate with other devices at other locations, the same location, or even other components within the same system. For example, the communication unit 608 may include a modem, a network card (wireless or wired), an infrared communication device, a wireless communication device (such as an antenna), and/or chipset (such as a Bluetooth® device, an 802.6 device (e.g., Metropolitan Area Network (MAN)), a Wi-Fi® device, a WiMax® device, a cellular communication device, etc.), and/or the like. The communication unit 608 may permit data to be exchanged with a network and/or any other devices or systems, such as those described in the present disclosure.

The operating system 610 may be configured to manage hardware and software resources of the computer system 600 and configured to provide common services for the computer system 600.

The user interface 612 may include any device configured to allow a user to interface with the computer system 600. For example, the user interface 612 may include a display, such as an LCD, LED, or other display, that is configured to present video, text, application user interfaces, and other data as directed by the processor 602. The user interface 612 may further include a mouse, a track pad, a keyboard, a touchscreen, volume controls, other buttons, a speaker, a microphone, a camera, any peripheral device, or other input or output device. The user interface 612 may receive input from a user and provide the input to the processor 602. Similarly, the user interface 612 may present output to a user.

The application 614 may be one or more computer-readable instructions stored on one or more non-transitory computer-readable media, such as the memory 604 or the file system 606, that, when executed by the processor 602, is configured to perform one or more of the steps of the methods disclosed herein. In some embodiments, the application 614 may be part of the operating system 610 or may be part of an application of the computer system 600, or may be some combination thereof. In some embodiments, the application 614 may function as the smart light applications 110 and 206.

Modifications, additions, or omissions may be made to the computer system 600 without departing from the scope of the present disclosure. For example, although each is illustrated as a single component in FIG. 6, any of the components 602-614 of the computer system 600 may include multiple similar components that function collectively and are communicatively coupled. Further, although illustrated as a single computer system, it is understood that the computer system 600 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 602 of FIG. 6) including various computer hardware or software applications, as discussed in greater detail below. Further, as indicated above, embodiments described herein may be implemented using computer-readable media (e.g., the memory 604 or file system 606 of FIG. 6) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

While the methods and systems provided above improve latency and lag issues that may exist when wirelessly transmitting lighting programs to a plurality of smart lights, these methods and systems do not address or resolve the issue of thermal color drift.

Lights often include a plurality of color channels. These color channels may include a single lighting element or multiple lighting elements. For example, a first color channel may include a single lighting element that is blue. A second color channel may include two lighting elements that together create an orange color. Regardless of the number of lighting elements that a particular lighting channel includes, each lighting channel includes its own independent power supply. The power supply may selectively control an amount of drive current supplied to each power channel. The power to a color channel can be increased to create a more intense light or it may be reduced to create a more dim light. Thus, in the first color channel that includes a single blue lighting element, the power may be controlled to determine an intensity level of the output. At a high power level, the intensity level will be high and the light will produce a bright blue. At a low power level, the intensity level will be low and the light will produce a dull blue. While the light color produced by the color channel will be the same, the intensity of the light can be controlled by selectively varying the power.

As lighting elements heat up, the intensity of the light may drop or become more dim. This is referred to herein as "thermal color drift." Importantly, thermal color drift is not consistent across different colors. For example, red lighting elements may be more susceptible to thermal color drift, while blue lighting elements may be more resistant to thermal color drift. This can result in thermal color drift resulting in different colors being rendered when two or more lighting elements are being mixed to create a different color. For example, if a blue color channel and a red color channel are both emitting light in order to render a purple color, a dimming of the red color channel will cause the rendered light to appear more blue than purple.

Thus, provided hereafter are methods and systems that compensate for thermal drift and ensure that a correct color is being rendered by lights with multiple color channels, which is also referred to herein as "active thermal compensation." Other variables may have an impact on actual light rendering. For example, a gamma correction, white balance correction, corrections for light covers or lenses may also be performed to achieve a desired color. The below disclosure, however, focuses on active thermal compensation, or correcting for thermal color drift alone.

Figure 7:
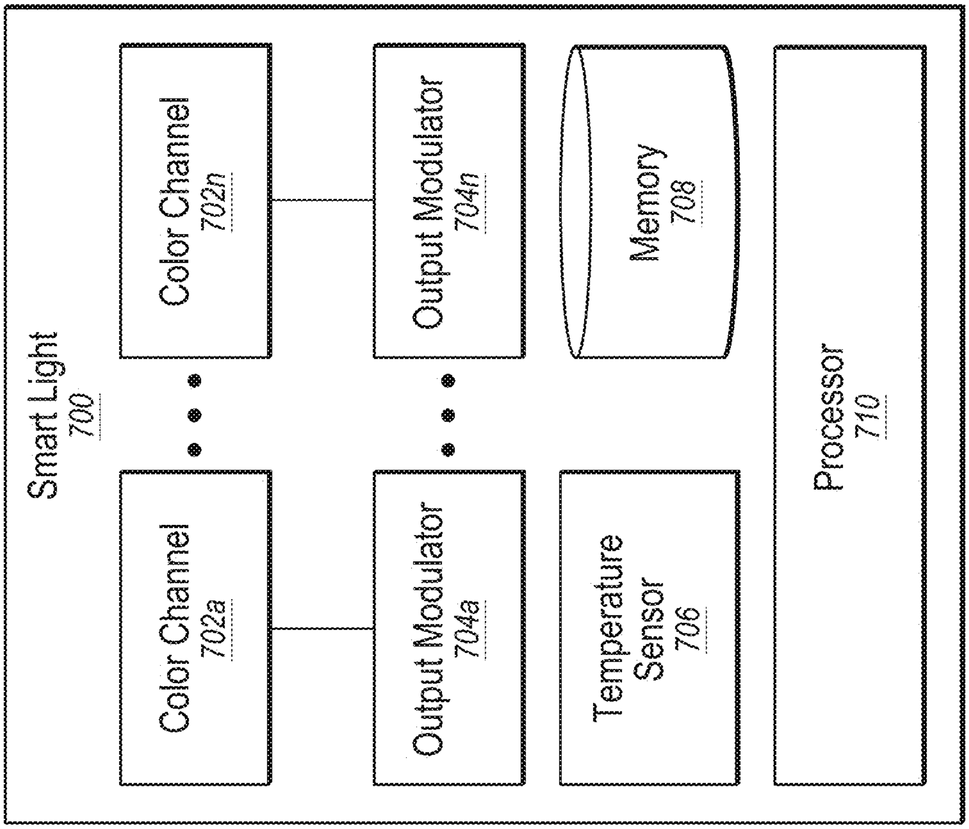
FIG. 7 illustrates an example smart light that may be used for active thermal compensation.

FIG. 7 illustrates an example smart light 700 that may be configured for active thermal compensation, or a color correction due to thermal color drift. The smart light 700 may be any of the smart lights within the group of smart lights 200*a*-200*n* illustrated in FIG. 1. The smart light 700 includes a plurality of color channels 802*a*-802*n*. These color channels may include one or more lighting elements, such as light emitting diodes (LEDs), which are each configured to illuminate a different color. Some color channels may include only a single lighting element while other color channels may include multiple lighting elements. Regardless of whether a color channel includes one or a plurality of lighting elements, each color channel outputs a single color. If the color channel includes only a single lighting element, it will output the color of that lighting element. If the color channel includes a plurality of lighting elements, it will output the color of the mixture of the lighting elements.

Any number of different color channels 702*a*-702*n* may be included in the smart light 700. In one embodiment, a smart light may include color channels that only render the additive primary colors, which are blue, green, and red. This is referred to herein as a "primary color light." In other embodiments, a smart light may include color channels that illuminate not only the additive primary colors, but also colors outside of the primary colors. For example, a smart light may include the primary colors and a yellow and or violet color channel. This is referred to herein as a "primary plus color light." To achieve colors outside of the primary colors, color channels of a primary plus color lights may rely on color channels that mix the light from two or more lighting elements. Alternatively, a lighting channel may include a single lighting element that emits a non primary color. For example, a primary plus color light may include a purple color channel. This color channel may rely on a mixture of a blue lighting element and a red lighting element. Alternatively, the purple color may be achieved by a single purple lighting element.

An output intensity of each of the color channels 702*a*-702*n* may be selectively controllable. To do this, a different output modulator 704*a*-704*n* may be associated with each of the color channels 702*a*-702*n*. For example, the output modulator 704*a* may control the output intensity of the color channel 702*a*. If the color emitting by the color channel 702*a* is blue, the output modulator 704*a* would control how bright or dim the blue light is from the color channel 702*a*. To do this, the output modulators 704*a*-704*n* are configured to selectively vary the drive current or power supplied to the color channels 702*a*-702*n*. An increase in drive current supplied by the output modulators 704*a*-704*n* to the color channels 702*a*-702*n* corresponds to an increase in light intensity (or brightness) of the color channels 702*a*-702*n*. Conversely, a decrease in drive current supplied by the output modulators 704*a*-704*n* to the color channels 702*a*-702*n* corresponds to a decrease in light intensity (or brightness) of the color channels 702*a*-702*n*.

The smart light 700 includes a temperature sensor 706. The temperature sensor 706 may measure the temperature of the color channels 702*a*-702*n*. In some embodiments, a separate temperature sensor 706 may be positioned proximate to each of the color channels 702*a*-702*n* to measure their temperatures independently. In other embodiments, the smart light 700 may include a single temperature sensor, which is used to determine the temperature of all of the color channels together.

The smart light 700 includes a memory 708. The memory may include values for light outputs for one or more of the color channels in order to achieve a desired color. The memory 708 may also include channel characterization data that correlates to the temperature of the lighting elements with the channel's output intensity. This channel characterization data may include values that correlate the luminous intensity of a particular channel to the temperature of its lighting elements. Each color channel may use a common scale for intensity, or may be converted to a common scale, such as 0 to 1 or 0 to 100. The memory 708 may also store one or more algorithms necessary to correct the effects of thermal color drift.

The smart light 700 includes a processor 710. The processor 710 may collect data from the temperature sensor 706 as well as data from the memory 708 to perform a color correction due to thermal color drift. Specifically, the processor 710 may read a current temperature from the temperature sensor 706 and determine, based on current temperature and the thermal color drift data stored in the memory 708, whether any of the colors being rendered by any of the light channels is experiencing thermal color drift. This data may be processed by a color mixing algorithm to determine whether a correction is necessary. If a correction is determined to be necessary, one or more of the output modulators 704*a*-704*n* may adjust a drive current being supplied to a corresponding color channel 702*a*-702*n* in order to correct the color output.

In order to compensate for thermal drift, an output modulator may either increase or decrease the drive current to a corresponding color channel. For example, if a red color channel and a blue color channel are being mixed to create a purple color at a desired intensity level of 0.4 (or 40%), and at the current temperature the red lighting element in the red color channel is experiencing a 50% decrease in intensity, the color output will appear more blue than purple because the intensity of the blue color channel is at 0.4 while the intensity of the red color channel (due to thermal color drift) is only at 0.2. To compensate for the color change in this example, the processor may instruct the output modulator associated with the blue color channel to decrease the drive current to 0.2 so that the correct color of purple is achieved. This compensation will result in a much dimmer purple light (only a 0.2 intensity output instead of the desired 0.4), however, the color will be correct. Alternatively, to compensate for the color change in this example, the processor may instruct the output modulator associated with the red color channel to increase the drive current to 0.8 so that red color channel is actually outputting a 0.4 intensity (due to thermal color drift) and the correct color of purple is achieved. This compensation will result in the desired intensity level of the purple light and the color will be correct.

In some embodiments, a smart light may not include a temperature sensor. In these embodiments, a processor may be configured to calculate the temperature of the color channels based on alternative (non temperature sensor) data. This alternative data may include a thermal efficiency of each color channel, a history of current supplied to each color channel, and a heat dissipation rate by a heat sink on the light. The thermal efficiency of each color channel may be data that is provided by a manufacturer in data sheets and represents the heat characteristics of a particular color channel. Alternatively, this data may be measured. The history of current supplied to the color channel may indicate how long the light has been on over a period of time. This value may be based on a windowed average or a weighted average. Thermal efficiencies and color channel histories may be determined for each color channel in a light. The heat dissipation rate may be measured or identified or estimated based on manufacturer data sheets. With this data, a current temperatures of color channels may be calculated.

Some embodiments may rely on both a temperature sensor and a calculation of the current temperature of a color channel. The temperature values identified by both methodologies may then be used together to identify a most reliable determination of the temperature. For example, an Extended Kalman Filter may be used to combine the results of these methodologies to identify a current temperature.

Figure 8:
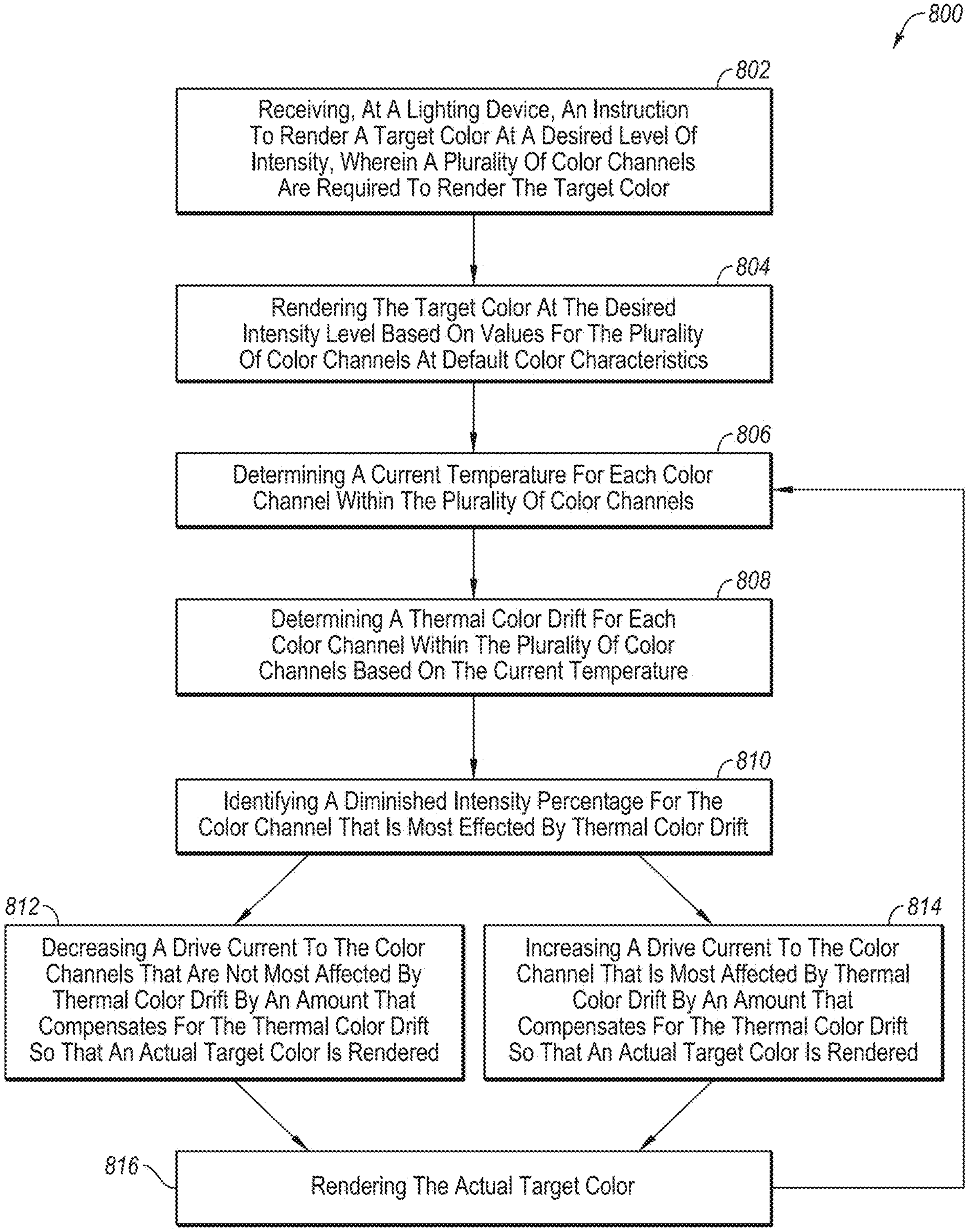
FIG. 8 illustrates a flowchart of a first example method for active thermal compensation.

FIG. 8 illustrates a flowchart of an example method 800 for active thermal compensation for a primary color light. The primary color light may have three color channels, a first blue color channel, a second green color channel, and a third red color channel. The method 800 may include, at step 802, receiving, at a lighting device, an instruction to render a target color at a desired level of intensity, wherein a plurality of color channels are required to render the target color. For example, in one embodiment, a white color may be the target color with an intensity level of 0.6. In this example, target color component values are represented on a scale from 0-1. Channel characterization values also represent the intensity of each channel on a common scale from 0-1. The numerical values of these scales are exemplary, as any numbers or scale magnitude designations may be used.

The method 800 may include, at step 804, rendering the target color at the desired intensity level based on values for the plurality of color channels at default color characteristics. For example, in order to achieve the target white color at the desired intensity level, a 0.4 level of intensity of the blue color channel, a 0.5 level of intensity of the green color channel, and a 0.6 level of intensity of the red color channel may be required. A color mixing algorithm may be used to determine levels of intensity for the plurality of color channels to render the target color at the desired level of intensity. Default color characteristics may be the color characteristics of the color channels in the absence of any effect from thermal color drift (in other words, when the color channels are cold).

The method 800 may include, at step 806, determining a current temperature for each color channel within the plurality of color channels. In some embodiments, a current temperature may be determined for all of the color channels in the lighting device, not just the plurality of color channels that are relied upon to render the target color. In some embodiments, the current temperature may be identified using a temperature sensor. In other embodiments, the current temperature may be calculated based on a thermal efficiency of each color channel, a history of current supplied to each color channel, and a heat dissipation rate by a heat sink on the light. In other embodiments, a current temperature may be identified based on both a sensed temperature and a calculated temperature.

The method 800 may include, at step 808, determining a thermal color drift for each color channel within the plurality of color channels based on the current temperature. Thermal color drift may be determined for each color channel through manufacturer data or by measuring the thermal color drift. Once this data is obtained, the thermal degradation of each color channel may be represented by a best fit linear approximation, or a polynomial, or another mathematical equation. Alternatively, thermal color drift may be identified through a look up table. Regardless of how this data is represented, the thermal color drift for each color channel based on the current temperature may be identified.

The method 800 may include, at step 810, identifying a diminished intensity percentage for the color channel that is most effected by thermal color drift. In the example provided above, the red color channel may be identified as being most effected by thermal color drift. It may also be determined that the diminished intensity percentage for the red color channel is 20%. In other words, the red color channel, instead of rendering a red color with an intensity of 0.6, is only rendering a red color with an intensity of 0.48 (a decrease of 20%, or 0.12).

The method 800 may include, at step 812, decreasing a drive current to the color channels that are not most effected by thermal color drift by an amount that compensates for the thermal color drift so that an actual target color is rendered. The amount that a drive current is decreased may be determined by the color mixing algorithm and one or more output modulators (such as output modulators 704*a*-704*n* in FIG. 7) may be relied upon to implement the drive current decrease. In the provided example, drive currents to the blue and green color channels (which were not affected by thermal color drift as much as the red color channel) may be reduced by 20%. Thus, the drive current to the blue color channel may be reduced by 20% so that the level of intensity of the blue color channel is 0.32 and the drive current to the green color channel may be reduced by 20% so that the level of intensity of the green color channel is 0.4. Reducing the intensities of the blue and green color channels will result in the desired white color light, however, the intensity will be lower, resulting in a light that is less bright or more dim than desired.

Alternatively, the method 800 may include, at step 814, increasing a drive current to the color channel that is most affected by thermal color drift by an amount that compensates for the thermal color drift so that an actual target color is rendered. The amount that a drive current is increased may be determined by the color mixing algorithm and one or more output modulators (such as output modulators 704*a*-704*n* in FIG. 7) may be relied upon to implement the drive current increase. In the provided example, the drive current to the red color channel may be increased so that its output (with the thermal color drift) is at the desired 0.6 level of intensity. To achieve this, the drive current would need to be increased to a level that would render a red color with an intensity of 0.75 without thermal drift so that after application of the 20% thermal drift, the red color channel is rendering the red at a level of intensity of 0.6. Increasing the intensity of the red color channel will not only render the target color, it will also maintain the desired level of intensity.

In some cases it may not be possible to increase the color channel that is most affected by thermal color drift to achieve the target color at the desired intensity. For example, if a white color is desired that requires 1.0 of all of each of the blue, green, and red color channels, the only option is to decrease drive currents to the color channels that are not most affected by thermal color drift. This is because the intensity of the color channel that is most affected by thermal color drift cannot be increased, as it is already at 1.0 (or 100%). In addition, if the color channel that is most affected by thermal color drift is increased, for example, to 100% to compensate for thermal drift, it could not be increased any higher. Thus, for example, if a red color channel is increased to 1.0 in order to achieve a 0.6 intensity, there would be no difference between 0.6 and 1.0 intensity levels, because the red color channel is already at its maximum level. This limitation in ability to increase in intensity may have a negative impact on certain effects, such as a fade, which relies on an ability to increase and decrease in levels of intensity.

Thus, in some embodiments, the decision on whether to decrease a drive current to color channels that are not most affected by the thermal color drift or increase the drive current to the color channel that is most affected by thermal drive may be based on how much of a potential increase (or "headroom") is required. For example, suppose a purple color is desired with 1.0 blue color channel and 0.5 red color channel and thermal color drift reduces the intensity of the red color channel by 20%. In this case, it would be best to increase the drive current to the red because there is no loss of potential increase, as the blue channel is already at its maximum level, 1.0. Thus, the determination of whether to implement step 812 or step 814 may be based on how much potential increase will be lost by increasing the drive current to the color channel that is most affected by thermal color drift, and how much potential increase is needed. A balancing evaluation may be performed between amount of potential increase that may be lost in the step 814 versus a loss of luminosity or intensity of the light that will result from the step 812.

Regardless of whether step 812 or 814 is taken, the actual target color will be rendered at a step 816, although it may not be at the desired level of intensity. This process may loop back to step 806, where current temperatures are again determined, and the subsequent steps may be performed to ensure that the target color is being rendered. In some embodiments, this looping function may occur many times in a single second. For example, in some embodiments, this process may be performed 30 or 60 or 90 times every second.

Although the steps of the method 800 are illustrated in FIG. 8 as discrete actions, various steps may be divided into additional steps, combined into fewer steps, reordered, expanded, or eliminated, depending on the desired implementation.

Figure 9:
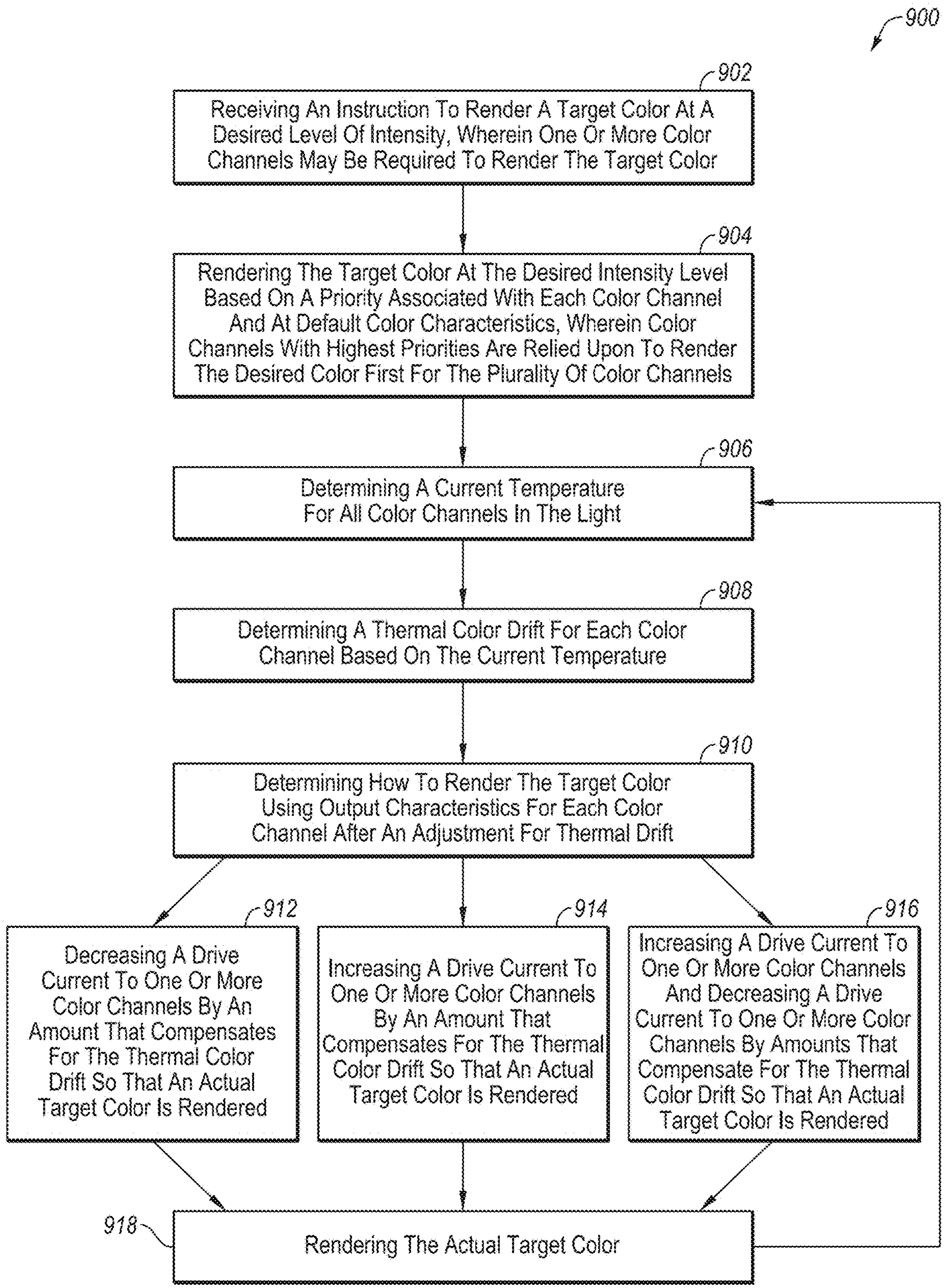
FIG. 9 illustrates a flowchart of a second example method for active thermal compensation.

FIG. 9 illustrates a flowchart of an example method 900 for active thermal compensation for a primary plus color light. The primary plus color light may have any number of different color channels. Some color channels may include more than a single lighting element to create a color output. In one embodiment, a primary color plus light may include five color channels, a first blue color channel, a second green color channel, a third red color channel, a fourth yellow color channel, and a fifth violet color channel.

The method 900 may include, at step 902, receiving an instruction to render a target color at a desired level of intensity, wherein one or more color channels may be required to render the target color. Depending on the desired color, a single color channel may be required to render the desired color. Alternatively, two or more color channels may be required to render the desired color.

The method 900 may include, at step 904, rendering the target color at the desired intensity level based on a priority associated with each color channel and at default color characteristics, wherein color channels with highest priorities are relied upon to render the desired color first for the plurality of color channels. Default color characteristics may be the color characteristics of the color channels in the absence of any affect from thermal color drift (in other words, when the color channels are cold), or at an arbitrary known temperature. Color channels may be assigned priorities based on a number of lighting elements that are included in the color channel. As the number of lighting elements in a color channel increase, the priority of that color channel may also increase. For example, if a first color channel includes 3 different lighting elements, a second color channel includes 2 different lighting elements, and a third color channel includes only a single lighting element, the first color channel would be assigned the highest priority, the third color channel would be assigned the lowest priority and the second color channel would be assigned a middle priority.

When a desired target light is being rendered, a color mixing algorithm may rely on color channels having a highest priority first. This will often lead to color channels with a lowest priority (which often include only a single lighting element) to be left unused and available for subsequent active thermal compensation.

The method 900 may include, at step 906, determining a current temperature for all color channels in the light. In some embodiments, the current temperature may be identified using a temperature sensor. In other embodiments, the current temperature may be calculated based on a thermal efficiency of each color channel, a history of current supplied to each color channel, and a heat dissipation rate by a heat sink on the light. In other embodiments, a current temperature may be identified based on both a sensed temperature and a calculated temperature.

The method 900 may include, at step 908, determining a thermal color drift for each color channel based on the current temperature. Thermal color drift may be determined for each color channel through manufacturer data or by measuring the thermal color drift. Once this data is obtained, the thermal degradation of each color channel may be represented by a best fit linear approximation, or a polynomial, or another mathematical equation. Alternatively, thermal color drift may be identified through a look up table. Regardless of how this data is represented, the thermal color drift for each color channel based on the current temperature may be identified.

The method 900 may include, at step 910, determining how to render the target color using output characteristics for each color channel after an adjustment for thermal drift. This step may also be performed by the color mixing algorithm and it may produce more than one possible way to render the target color after adjusting for thermal drift of each color channel. These possible ways to correct for thermal drift are identified in steps 912, 914, and 916.

The method 900 may include, at step 912, decreasing a drive current to one or more color channels by an amount that compensates for the thermal color drift so that an actual target color is rendered. Alternatively, the method may include, at step 914, increasing a drive current to one or more color channels by an amount that compensates for the thermal color drift so that an actual target color is rendered. Alternatively still, the method 900 may include, at step 916, increasing a drive current to one or more color channels and decreasing a drive current to one or more color channels by amounts that compensate for the thermal color drift so that an actual target color is rendered. The specific step implemented to correct for thermal drift may be determined based on a number of different factors that are evaluated by the color mixing algorithm. The color mixing algorithm may be required to loop back and rerun its analysis with updated values to determine which step (912, 914, or 916) is best.

For example, in some cases it may not be possible to increase the color channel that is most affected by thermal color drift to achieve the target color at the desired intensity. This is because the intensity of a color channel that is affected by thermal color may already be at a maximum intensity level and there may not be any other color channels to which a drive current may be increased to compensate for the drift. In addition, if all of the color channels that may be used to render a particular color would need to be increased to a high level (for example, to 100%) to compensate for thermal drift, it would be impossible to increase an intensity level of this color. Thus, for example, if all of the color channels containing a red lighting element are increased to 100% in order to render an orange color at a 0.6 level of intensity, there would be no difference between 0.6 and 1.0 intensity levels, for the orange color because the red color channels are already at their maximum levels. This limitation in ability to increase in intensity may have a negative impact on certain effects, such as a fade, which relies on an ability to increase and decrease in levels of intensity. Finally, some actual color may be sacrificed in order to render a light at the desired intensity level. For example, it may be impossible to render a purple color at 100% intensity due to thermal drift. A violet color may be the only option available at 100% intensity. Thus, some actual color may be sacrificed to achieve a desired level of intensity.

Thus, in some embodiments, the decision on whether to decrease a drive current to one or more color channels, or increase the drive current to one or more color channels (or do a combination of both) may be based on how much of a potential increase (or "headroom") in intensity may be lost if drive current is increased to correct for thermal color drive. The determination may also be based on how much a level of intensity would be reduced if drive current is decreased to correct for thermal color drive. The determination may also be based on how much a color may change if a color is rendered at the desired level of intensity.

Regardless of whether step 912, 914, or 916 is taken, an actual target color will be rendered at a step 918, although it may not be at the desired level of intensity or it may have a slightly different color. This process may loop back to step 906, where current temperatures are again determined, and the subsequent steps may be performed. In some embodiments, this looping function may occur many times in a single second. For example, in some embodiments, this process may be performed 30 or 60 or 90 times every second.

Although the steps of the method 900 are illustrated in FIG. 9 as discrete actions, various steps may be divided into additional steps, combined into fewer steps, reordered, expanded, or eliminated, depending on the desired implementation.

The systems and methods provided herein for active thermal compensation may be incorporated into the system for implementing a lighting program 100 illustrated in FIG. 1, the smart light used in executing a lighting program illustrated in FIG. 2, the process flow diagram for executing a lighting program illustrated in FIG. 4, or the methods for executing a lighting program illustrated in FIGS. 4 and 5. For example, the smart light 700 that compensates for thermal color drift may be one or more of the smart lights 200*a*-200*n* illustrated in FIGS. 1 and 2. In addition, the methods for active thermal compensation in methods 800 and 900 may be implemented in the process flow diagram 300 and methods 400 and 500. For example, active thermal compensation may be performed as part of step 318 in the process flow diagram 300 or step 516 of method 500.

The above examples are provided with human based additive primary colors (blue, green, red). However, primary colors may be defined based on a particular application. For example, in another embodiment, the primary colors may be different for plants in greenhouse applications. Alternatively, primary colors may be different for fish and/or coral in aquatic applications.

In addition, the colors identified herein are in the red, green, and blue (RGB) color space. However, the principles taught herein may be applied to different color spaces, such as hue, saturation, and value (HSV) and international commission on illumination (CIE) spectrum. Conversions that are known in the art may be applied to convert the RGB values herein to corresponding values in a different color space.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

What is claimed is:

1. A method for implementing a lighting program by a plurality of smart lights, the method comprising:
- receiving, from a controller, one or more parameters of a lighting program at the plurality of smart lights, each smart light having a light index;
- storing the one or more parameters of the lighting program;
- receiving, from the controller, a preliminary synchronization signal;
- initiating a timer based on the preliminary synchronization signal;
- configuring a rendering algorithm based on input including at least the light index, the one or more parameters of the lighting program, and a current time on the timer;
- executing the rendering algorithm to determine a frame value;
- implementing a lighting output consistent with the determined frame value;
- receiving, from the controller, an updated synchronization signal;
- determining whether the current time on the timer and a time in the updated synchronization signal match; and
- when the current time on the timer and the updated synchronization signal do not match, updating the timer to be consistent with the updated synchronization signal.

2. The method of claim 1, further comprising:
- transmitting, from the plurality of smart lights to the controller, a confirmation of receipt of the one or more parameters of the lighting program.

3. The method of claim 2, wherein the confirmation of receipt of the one or more parameters of the lighting program is wirelessly transmitted to the controller as a modified 2.4 GHz WiFi packet.

4. The method of claim 1, wherein the rendering algorithm is executing with an updated current time input at predetermined intervals to determine the frame value.

5. The method of claim 4, wherein the predetermined intervals provide for at least 60 separate lighting output values to be determined every second.

6. The computing device of claim 5, wherein the confirmation of receipt of the one or more parameters of the lighting program is wirelessly transmitted to the controller as a modified 2.4 GHz WiFi packet.

7. The method of claim 1, wherein each smart light in the plurality of smart lights has a unique light index.

8. A computing device comprising:
- one or more processors; and
- one or more non-transitory computer-readable media comprising one or more computer-readable instructions that, when executed by the one or more processors, cause the computing device to perform a method for implementing a lighting program by a plurality of smart lights, the method comprising:
  - receiving, from a controller, one or more parameters of a lighting program at the plurality of smart lights, each smart light having a light index;
  - storing the one or more parameters of the lighting program;
  - receiving, from the controller, a preliminary synchronization signal;
  - initiating a timer based on the preliminary synchronization signal;
  - configuring a rendering algorithm based on input including at least the light index, the one or more parameters of the lighting program, and a current time on the timer;
  - executing the rendering algorithm to determine a frame value;
  - implementing a lighting output consistent with the determined frame value;
  - receiving, from the controller, an updated synchronization signal;
  - determining whether the current time on the timer and a time in the updated synchronization signal match; and
  - when the current time on the timer and the updated synchronization signal do not match, updating the timer to be consistent with the updated synchronization signal.

9. The computing device of claim 8, further comprising:
- transmitting, from the plurality of smart lights to the controller, a confirmation of receipt of the one or more parameters of the lighting program.

10. The computing device of claim 8, wherein the rendering algorithm is executing with an updated current time input at predetermined intervals to determine the frame value.

11. The computing device of claim 10, wherein the predetermined intervals provide for at least 60 separate lighting output values to be determined every second.

12. A method for implementing a lighting program by a plurality of smart lights, the method comprising:

receiving, from a controller, one or more parameters of a lighting program at the plurality of smart lights, each smart light having a light index;

storing the one or more parameters of the lighting program;

receiving, from the controller, a preliminary synchronization signal;

initiating a timer based on the preliminary synchronization signal;

configuring a rendering algorithm based on input including at least the light index, the one or more parameters of the lighting program, and a current time on the timer;

executing the rendering algorithm to determine a frame value, wherein the rendering algorithm is executing with an updated current time input at predetermined intervals to determine the frame value and the predetermined intervals provide for at least 60 separate lighting output values to be determined every second; and implementing a lighting output consistent with the determined frame value.

13. The method of claim 12, further comprising:

transmitting, from the plurality of smart lights to the controller, a confirmation of receipt of the one or more parameters of the lighting program.

14. The method of claim 13, wherein the confirmation of receipt of the one or more parameters of the lighting program is wirelessly transmitted to the controller as a modified 2.4 GHz WiFi packet.

15. The method of claim 12, wherein each smart light in the plurality of smart lights has a unique light index.

* * * * *